US012677736B2

(12) United States Patent
Landin

(10) Patent No.: US 12,677,736 B2
(45) Date of Patent: Jul. 14, 2026

(54) ROBOTIC WORK TOOL GRASS DETECTION AND DIRECTIONAL OPERATION SYSTEMS AND METHODS

(71) Applicant: HUSQVARNA AB, Huskvarna (SE)

(72) Inventor: Rickard Landin, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 289 days.

(21) Appl. No.: 18/507,674

(22) Filed: Nov. 13, 2023

(65) Prior Publication Data

US 2024/0155973 A1     May 16, 2024

(30) Foreign Application Priority Data

Nov. 14, 2022    (SE) ..................................... 2251333-7

(51) Int. Cl.
*A01D 34/00*          (2006.01)
*A01D 101/00*        (2006.01)

(52) U.S. Cl.
CPC ........ *A01D 34/008* (2013.01); *A01D 2101/00* (2013.01)

(58) Field of Classification Search
CPC ........................... A01D 34/008; A01D 2101/00
See application file for complete search history.

(56) References Cited

U.S. PATENT DOCUMENTS

| | | | | |
|---|---|---|---|---|
| 6,255,793 | B1 * | 7/2001 | Peless ..................... | G01C 22/00 |
| | | | | 318/580 |
| 7,010,425 | B2 * | 3/2006 | Gray ..................... | G05D 1/0274 |
| | | | | 701/410 |
| 8,027,761 | B1 * | 9/2011 | Nelson ..................... | G01S 1/805 |
| | | | | 701/50 |
| 8,275,506 | B1 * | 9/2012 | Bishel .................. | G05D 1/0242 |
| | | | | 701/25 |
| 9,471,063 | B2 * | 10/2016 | Ouyang .................. | G01S 11/14 |
| 10,034,421 | B2 | 7/2018 | Doughty et al. | |
| 10,444,756 | B2 | 10/2019 | Kamfors et al. | |
| 10,705,533 | B1 * | 7/2020 | Bishel .................. | G05D 1/0255 |
| 11,073,827 | B2 * | 7/2021 | Ko ........................ | A01D 34/008 |

(Continued)

FOREIGN PATENT DOCUMENTS

| | | |
|---|---|---|
| CN | 109845475 A | 6/2019 |
| SE | 2050727 A1 | 12/2021 |

(Continued)

OTHER PUBLICATIONS

Search Report and Office Action for Swedish Application No. 2251333-7 mailed May 25, 2023.

*Primary Examiner* — Ramsey Refai
(74) *Attorney, Agent, or Firm* — Burr & Forman

(57)                    ABSTRACT

A robotic work tool system comprising a robotic work tool arranged to operate in an operational area at least partially covered with grass, wherein the operational area is bounded by a rudimentary boundary, and the robotic work tool comprising a grass sensor and a controller is configured to receive sensor input from the grass sensors, determine a position of the robotic work tool, determine that the robotic work tool is on grass, and then determine that the position is outside a maximum distance of the rudimentary boundary and then change direction of operation or determine that the position is inside the maximum distance of the rudimentary boundary and then keep operating.

16 Claims, 6 Drawing Sheets

(56)        References Cited

U.S. PATENT DOCUMENTS

| | | | |
|---|---|---|---|
| 2006/0161318 A1* | 7/2006 | Aldred | G05D 1/0227 |
| | | | 701/25 |
| 2008/0039974 A1* | 2/2008 | Sandin | G05D 1/0255 |
| | | | 901/46 |
| 2009/0254218 A1 | 10/2009 | Sandin et al. | |
| 2013/0041526 A1* | 2/2013 | Ouyang | A01D 34/008 |
| | | | 701/2 |
| 2013/0192184 A1* | 8/2013 | Choi | G05D 1/0234 |
| | | | 701/50 |
| 2014/0324269 A1* | 10/2014 | Abramson | B60L 1/003 |
| | | | 901/1 |
| 2015/0250097 A1 | 9/2015 | Jägenstedt et al. | |
| 2015/0271991 A1* | 10/2015 | Balutis | G05D 1/0011 |
| | | | 700/264 |
| 2015/0328775 A1* | 11/2015 | Shamlian | B60L 53/68 |
| | | | 901/1 |
| 2015/0366129 A1* | 12/2015 | Borinato | B60L 53/60 |
| | | | 701/25 |
| 2016/0100522 A1* | 4/2016 | Yamauchi | G05D 1/0219 |
| | | | 701/25 |
| 2016/0129593 A1 | 5/2016 | Wolowelsky et al. | |
| 2017/0146654 A1* | 5/2017 | Halloran | G01S 17/931 |
| 2020/0356088 A1 | 11/2020 | Schlacks et al. | |
| 2021/0341939 A1 | 11/2021 | Lee et al. | |
| 2021/0373562 A1 | 12/2021 | Bousani et al. | |
| 2022/0124973 A1 | 4/2022 | Juel | |
| 2022/0305658 A1 | 9/2022 | Arlig et al. | |

FOREIGN PATENT DOCUMENTS

| | | | |
|---|---|---|---|
| SE | 2150327 A1 | 9/2022 | |
| WO | 2021183018 A1 | 9/2021 | |

* cited by examiner

200

220

200

205

ROBOTIC WORK TOOL GRASS DETECTION AND DIRECTIONAL OPERATION SYSTEMS AND METHODS

TECHNICAL FIELD

This application relates to a robotic work tool, such as a lawnmower, and a method for providing an improved operation as well as installation of a robotic work tool as regards the boundary of an operational area.

BACKGROUND

Automated or robotic work tools such as robotic lawnmowers are becoming increasingly more popular and so is the use of the robotic work tool in various types of operational areas.

Such operational areas, in particular for robotic work tools being robotic lawnmowers, often include irregular areas which are difficult to accurately define boundaries for which makes the installation of such robotic work tool systems cumbersome.

Thus, there is a need for an improved manner of providing a simplified installation as regards boundaries.

SUMMARY

It is therefore an object of the teachings of this application to overcome or at least reduce those problems by providing a robotic work tool system comprising a robotic work tool arranged to operate in an operational area at least partially covered with grass, wherein the operational area is bounded by a rudimentary boundary, and the robotic work tool comprising a grass sensor and a controller is configured to receive sensor input from the grass sensors, determine a position of the robotic work tool, determine that the robotic work tool is on grass, and then determine that the position is outside a maximum distance of the rudimentary boundary and then change the direction of operation or determine that the position is inside the maximum distance of the rudimentary boundary and then keep operating.

In some embodiments the controller is further configured to determine that the robotic work tool is at a grass edge and then change direction of operation.

In some embodiments the controller is further configured to determine that the position is inside a minimum distance of the rudimentary boundary and then keep operating or determine that the position is outside the minimum distance of the rudimentary boundary and then do the change of direction of operation.

In some embodiments the robotic work tool further comprises a satellite navigation sensor and wherein the robotic work tool is configured to determine the position based on the satellite navigation sensor.

In some embodiments the robotic work tool further comprises a visual navigation sensor and wherein the robotic work tool is configured to determine the position based on the visual navigation sensor.

In some embodiments the controller is further configured to determine the position of the robotic work tool based on a map application, and wherein the rudimentary boundary is indicated in said map application. In some such embodiments the controller is further configured to receive the rudimentary boundary as one or more geometric shapes from a user of a server.

In some embodiments the maximum distance is homogenous.

In some embodiments the maximum distance is heterogenous.

In some embodiments the controller is further configured to change the direction of operation by turning.

In some embodiments the controller is further configured to change the direction of operation by reversing.

In some embodiments the controller is further configured to change the direction of operation by reversing and turning.

In some embodiments the robotic work tool is a robotic lawnmower.

It is also an object of the teachings of this application to overcome the problems by providing a method for use in a method for use in robotic work tool system comprising a robotic work tool arranged to operate in an operational area at least partially covered with grass, wherein the operational area is bounded by a rudimentary boundary, and the robotic work tool comprising a grass sensor, and wherein the method comprises receiving sensor input from the grass sensors, determining a position of the robotic work tool, determining that the robotic work tool is on grass, and then determining that the position is outside a maximum distance of the rudimentary boundary and then change direction of operation or determining that the position is inside the maximum distance of the rudimentary boundary and then keep operating.

It is also an object of the teachings of this application to overcome the problems by providing a computer-readable medium carrying computer instructions that when loaded into and executed by a controller of a robotic work tool enables the robotic work tool to implement the method according to herein.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying draw-ings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools.

Figure 1A:
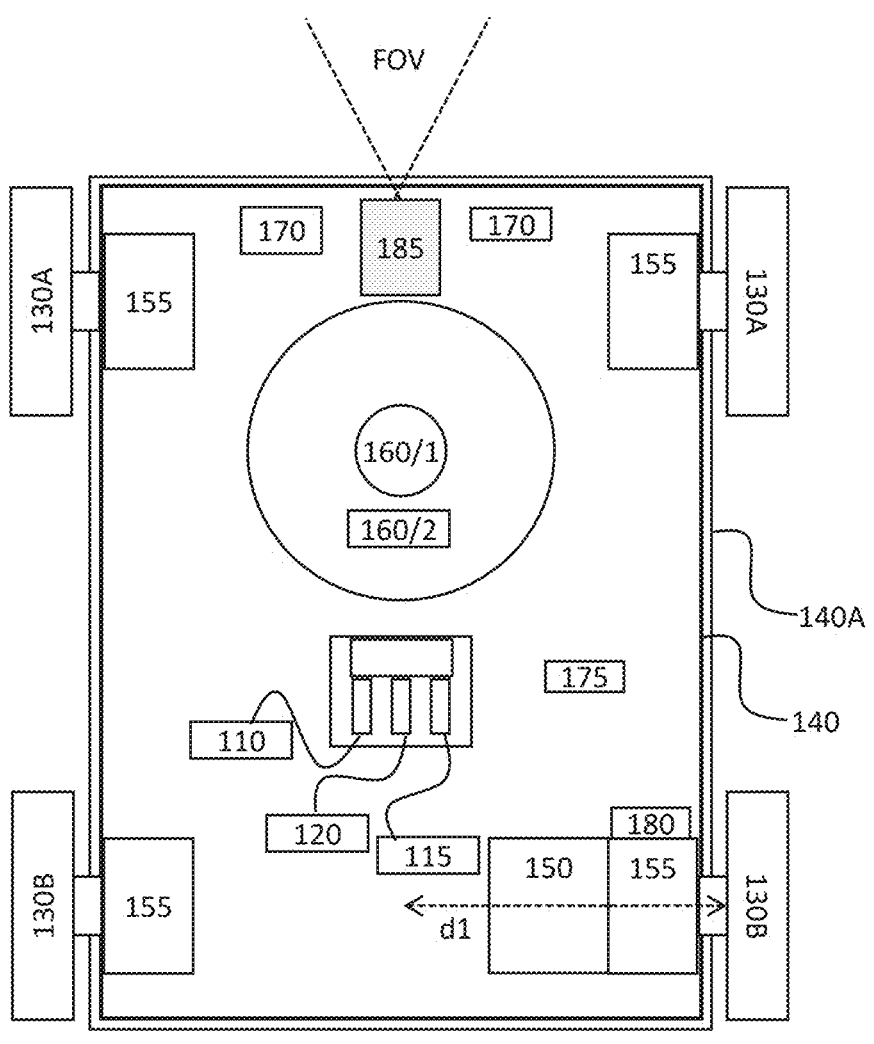
FIG. 1A shows a schematic view of the components of an example of a robotic work tool being a robotic lawnmower according to some example embodiments of the teachings herein.

FIG. 1A shows a schematic overview of a robotic work tool 100, here exemplified by a robotic lawnmower 100. The robotic work tool 100 may be a multi-chassis type or a mono-chassis type (as in FIG. 1A). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 1 meter for large robots arranged to service for example airfields.

It should be noted that even though the description herein is focused on the example of a robotic lawnmower, the teachings may equally be applied to other types of robotic work tools, such as robotic watering tools, robotic golf ball collectors, and robotic mulchers to mention a few examples.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within an operational area, where the robotic work tool propels itself across or around the operational area in a pattern (random or predetermined).

The robotic work tool 100, exemplified as a robotic lawnmower 100, has a main body part 140, possibly com-prising a chassis 140 and an outer shell 140A, and a plurality of wheels 130 (in this example four wheels 130, but other number of wheels are also possible, such as three or six).

It should be noted that even though the disclosure herein will be directed at a robotic lawnmower as the main example, it should be clear that the same also applies to other robotic work tools that are arranged to operate on grass surfaces. Examples include but are not limited to robotic grass mulchers, watering robots, golfball collecting robots, robotic fertilizers to mention a few examples.

The main body part 140 substantially houses all compo-nents of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150. It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instruc-tions that enable hardware functionality, for example, by using executable computer program instructions in a gen-eral-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suit-able, available processor or Programmable Logic Circuit (PLC). The memory 120 may be implemented using any commonly known technology for computer-readable memo-ries such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (not shown but will be regarded as being an example of a server, as an example of a connected device) as discussed in relation to FIG. 2 below for provid-ing information regarding status, location, and progress of operation to the user equipment as well as receiving com-mands or settings from the user equipment. Alternatively or additionally, the robotic lawnmower 100 may be arranged to communicate with a server (referenced 240 in FIG. 2) for providing information regarding status, location, and prog-ress of operation as well as receiving commands or settings. Especially the server may be arranged to provide map information or other information on a work area such as information on the boundary.

The robotic lawnmower 100 also comprises a work tool 160, which in the example of the robotic lawnmower 100 is a grass cutting device 160, such as a rotating blade 160/2 driven by a cutter motor 160/1. In embodiments where the robotic work tool 100 is exemplified as an automatic grinder, the work tool 160 is a rotating grinding disc.

For enabling the robotic lawnmower 100 to navigate with reference to a wire, such as a boundary wire or a guide wire, emitting a magnetic field caused by a control signal trans-mitted through the wire, the robotic lawnmower 100 is, in some embodiments, configured to have at least one magnetic field sensor 170 arranged to detect the magnetic field and for detecting the wire and/or for receiving (and possibly also sending) information to/from a signal generator. In some embodiments, such a magnetic boundary is used to provide a border (not shown explicitly in FIG. 2, but deemed to be included in the boundary 220) enclosing an operational area (referenced 205 in FIG. 2).

In some embodiments the robotic lawnmower 100 comprises a satellite signal navigation sensor 175 configured to provide navigational information (such as position) based on receiving one or more signals from a satellite—possibly in combination with receiving a signal from a base station. In some embodiments the satellite navigation sensor is a GPS (Global Positioning System) device or other Global Navigation Satellite System (GNSS) device. In some embodiments the satellite navigation sensor 175 is a RTK sensor. This enables the robotic work tool to operate in an operational area bounded by a virtual border (not shown explicitly in FIG. 2 but deemed to be included in the boundary 220).

The robotic lawnmower 100 also comprises deduced reckoning sensors 180. The deduced reckoning sensors may be odometers, accelerometers or other deduced reckoning sensors. In some embodiments the deduced reckoning sensors 180 include visual sensors, such as for Simultaneous Localization And Mapping, SLAM, navigation or other visual navigation. In such embodiments the boundary may be bounded by reference objects (not shown explicitly in FIG. 2 but deemed to be included in the boundary 220).

In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The deduced reckoning sensors 180, especially in combination with the visual odometry sensor, enables the root to operate according to a map of the operational area. In some such embodiments, the navigation is based on SLAM, and in some embodiments, where a visual odometry sensor (such as a camera) is utilized, the navigation is based on V-SLAM.

The robotic lawnmower 100 is in some embodiments arranged to operate according to a map application (indicated in FIG. 2 and referenced 120A) representing one or more operational areas (and possibly the surroundings of the operational area(s)) as well as features of the operational area(s) stored in the memory 120 of the robotic lawnmower 100. In some embodiments, the map is also or alternatively stored in the memory of a server (referenced 240 in FIG. 2). The map application may be generated or supplemented as the robotic lawnmower 100 operates or otherwise moves around in the operational area. In some embodiments, the map application is downloaded, possibly from the server. In some embodiments, the map application also includes one or more transport areas. The robotic lawnmower 100 is arranged to navigate according to the map based on the deduced reckoning sensors 180 and/or the satellite navigation sensor 175.

In some embodiments the robotic lawnmower is arranged or configured to traverse and operate in operational areas that are not essentially flat, but contain terrain that is of varying altitude, such as undulating, comprising hills or slopes or such. The ground of such terrain is not flat and it is not straightforward how to determine an angle between a sensor mounted on the robotic lawnmower and the ground. The robotic lawnmower is also or alternatively arranged or configured to traverse and operate in an operational area that contains obstacles that are not easily discerned from the ground. Examples of such are grass or moss-covered rocks, roots or other obstacles that are close to ground and of a similar colour or texture as the ground. The robotic lawnmower is also or alternatively arranged or configured to traverse and operate in an operational area that contains obstacles that are overhanging, i.e. obstacles that may not be detectable from the ground up, such as low hanging branches of trees or bushes. Such a garden is thus not simply a flat lawn to be mowed or similar, but an operational area of unpredictable structure and characteristics. The operational area exemplified with referenced to FIG. 2, may thus be such a non-uniform operational area as disclosed in this paragraph that the robotic lawnmower is arranged to traverse and/or operate in.

The robotic lawnmower also comprises a grass sensor 185, possibly comprised in or connected to the deduced reckoning sensors 180 when the deduced reckoning sensors 180 include visual sensors.

In some embodiments, the grass sensor includes a visual sensor 185 arranged to provide images of the surface of the area operated on which images may be analyzed so as to determine whether the robotic lawnmower is operating on grass or not, and also to identify an edge of the grass.

In some embodiments the grass sensor 185 includes a reflected light sensor is a sensor that is adapted to receive reflected light data and comparing the reflected light data with a specific wavelength parameters known to identify grass; and classifying the reflected light data as grass when the reflected light data meets the specific wavelength structural parameters indicative of grass, wherein comparing the reflected light data comprising measuring reflected light emitted from a LED at a specific wavelength, employing a normalized difference vegetation index (NDVI) algorithm to analyze the reflected light to determine if chlorophyll is present. The grass detector is configured to detect grass based on structural and configured components that are able to perceive chlorophyll and indicate grass.

In embodiments where the grass sensor 185 includes a visual sensor or a reflected light sensor, the data received from the grass sensor 185 may also provide grass health information that can be displayed for the user in a remote device such as the user equipment.

In some embodiments the grass sensor 185 includes a radar. In embodiments where the grass sensor includes a radar sensor, the grass sensor can also be utilized to determine if the robotic work tool is slipping by receiving "a flat echo" from radar transceivers when the robot is standing still, but the same or very similar "flat echo" is received when there is no grass, or that the robot is slipping (i.e. standing still). A flat echo indicates that the surface is flat, however, this is unrealistic in most outdoor operational areas as the surface will have some irregularities. An echo indicating a flat echo is thus more likely to indicate that the robot is actually standing still. And if the wheels are turning at the same time, the robot is slipping. Or if the wheel motor is provided a current high enough to normally drive the wheel(s), but a flat echo is received, the robot is stuck.

In some embodiments the robotic work tool system may further be configured for and the method may further comprise generating a map of the work area 205, which map indicates grass quality at various positions, which grass quality is based on the data received from the grass sensor 185 and may include information on the health of the grass or conditions such as risk of slippage.

It should be noted that the grass sensor 185 may include one, or more types of grass sensors and that the types of grass sensors included may not be directed solely at detecting grass.

Figure 1B:
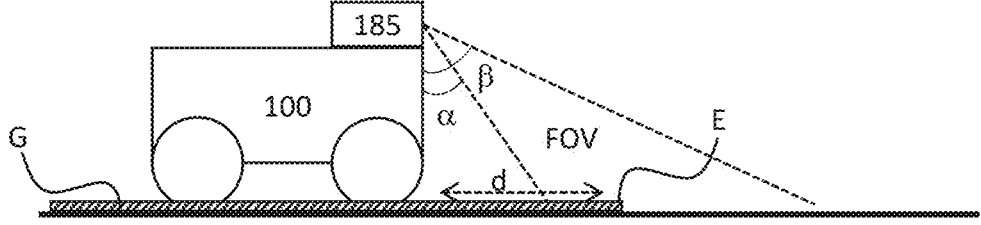
FIG. 1B shows a schematic side-view of an example of a robotic work tool operating on a surface partially covered with grass.

FIG. 1B shows a situation where the robotic lawnmower 100 is navigating a surface of an operational area utilizing a grass sensor for example being a camera (or other imaging apparatus 185. Knowing one or more angles α, β of the Field-Of-View (FOV) of the grass sensor 185 (as well as knowing the height of the camera's placement form the ground), enables for an accurate determination of the distance d from the robotic work tool 100 to a detected edge E of the grass G whereby the robotic work tool 100 can determine if it is operating on grass or not and if the robotic work tool 100 is approaching or at the edge of the grass. As a skilled person would understand the robotic work tool 100 may determine that it is operating on grass if the surface is determined to be grass even if no edge is detected in the images.

Figure 2:
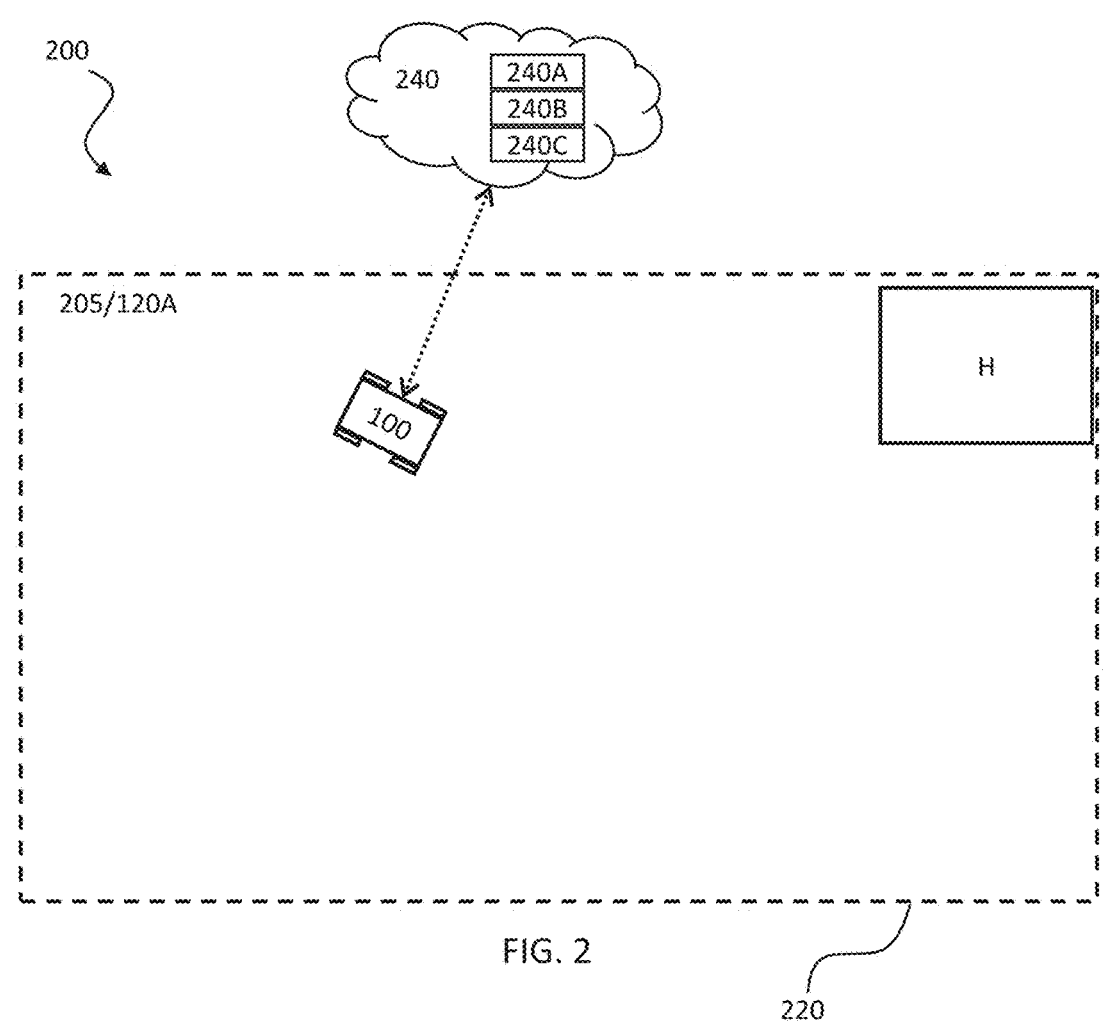
FIG. 2 shows a schematic view of a robotic work tool system according to some example embodiments of the teachings herein.

FIG. 2 shows a robotic lawnmower system 200 in some embodiments. The schematic view is not to scale. The robotic lawnmower system 200 comprises one or more robotic lawnmowers 100 according to the teachings herein arranged to operate in one or more operational areas 205 possibly bounded by a boundary 220. It should be noted that the operational area 205 shown in FIG. 2 is simplified for illustrative purposes.

The view of the operational area 205 is also intended to be an illustration or graphical representation of the map application 120A discussed in the above.

A server 240 is shown as an optional connected device for the robotic lawnmower 100 to communicate with—possibly for receiving maps or map updates. The server 240 comprises a controller 240A for controlling the operation of the server 240, a memory 240B for storing instructions and data relating to the operation of the server 240 and a communication interface 240C for enabling the server 240 to communicate with other entities, such as the robotic lawnmower 100, and/or a User Equipment such as a mobile phone. The controller, the memory and the communication interface may be of similar types as discussed in relation to FIG. 1 for the robotic lawnmower 100.

The server 240 may be a cloud service, a dedicated service provider server, or an application running in a local personal computer, a tablet computer or a smart phone. For the reasons of this application it should be noted that there will be made no difference between the types of servers, but the description will focus on a server being implemented in an application for execution in a user equipment such as a smartphone, a personal computer, or a tablet computer.

As is shown in FIG. 2 there may be obstacles such as houses, structures, trees to mention a few examples in the operational area 205. In FIG. 2 such obstacles are indicated and referenced H (as in house).

It should be noted that any processing may be done in any, some or all of the controller 110 of the robotic lawnmower 100 and/or the controller 240A of the server 240 and that the processing may also be done partially in one controller 110/240A for supplemental processing in the other controller 110/240A. This is indicated in FIG. 2 in that a dashed arrow is shown between the server 240 and the robotic lawnmower 100 for indicating that information may be passed freely between them for (partial) processing.

Figure 3A:
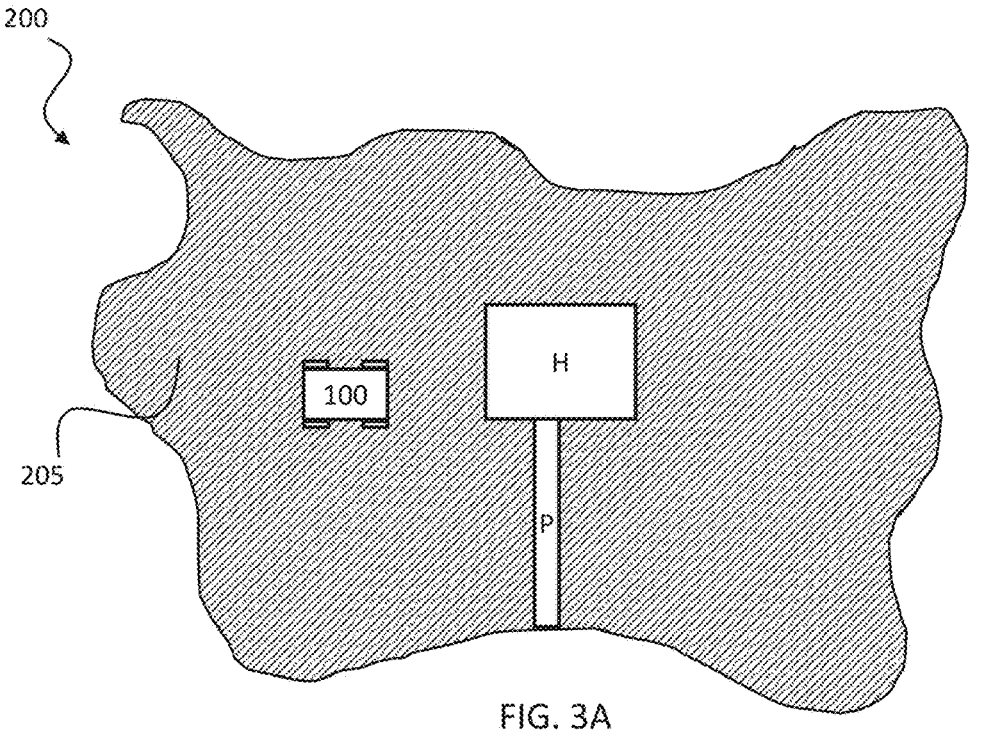
FIGS. 3A to 3E each shows a schematic view of a robotic work tool system according to some example embodiments of the teachings herein.

FIG. 3A shows an example of a work area 205 for a robotic lawnmower system 200. In this example the work area basically comprises a grass lawn 205 and in FIG. 3A the grass is indicated as the marked area. On the grass area one or more features may be present and in this illustrated example a house (H) and a path (P) to the house is shown as examples of features.

as the inventors have realized, marking such an irregular work area accurately constitutes tedious work, no matter if it is done virtually on a map application, in real life by teaching the robotic lawnmower or by laying a boundary wire. The inventors are therefore proposing to provide a simplified manner of establishing a working area boundary, wherein a rudimentary boundary is provided and the robotic lawnmower 100 is configured to operate in the work area based on the rudimentary boundary 220 and the grass sensor 185.

In some embodiments the rudimentary boundary is provided by a user through an application in the server 240 such as by drawing a boundary on a map representation.

In some embodiments the rudimentary boundary is provided by the server 240 by the server approximating a boundary from a map representation of the work area, such as through image analysis based on a satellite image of the work area.

Figures 3B, 3C:
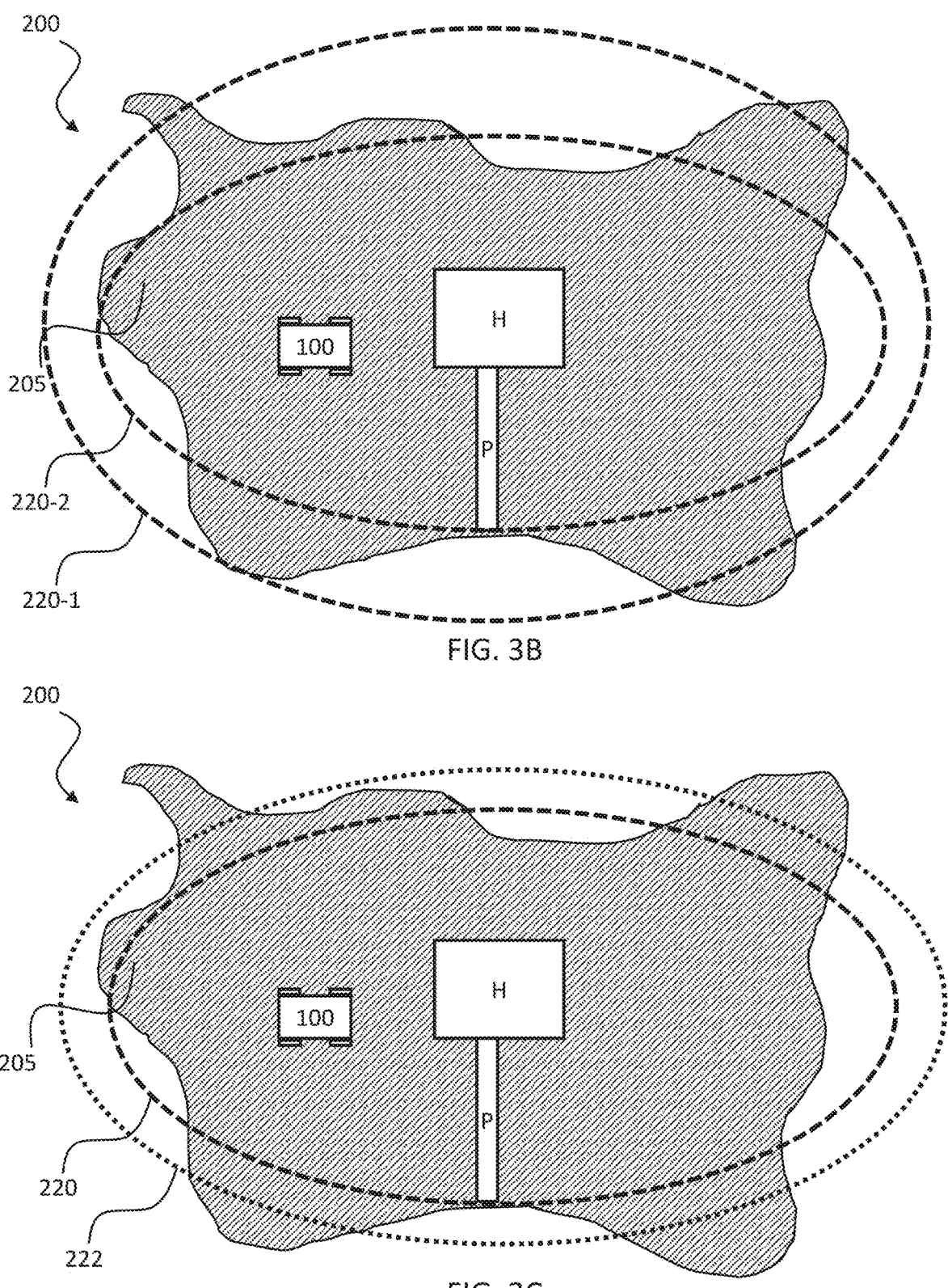

FIG. 3B shows an example embodiment of the same work area 205 as in FIG. 3A, but where the rudimentary boundary 220 is also indicated. As can be seen a rudimentary boundary is a boundary that does not follow the edges of the work area, and wherein the work area may in some cases extend beyond the rudimentary boundary in one, some or all portions of the work area and/or in some cases not extend out to the rudimentary boundary in one, some or all portions of the work area.

In some embodiments, the rudimentary boundary has the shape of one or more geometrical shapes, such as a rectangle, an oval, a circle, a stadium, or a diamond or any such shape which is angled or otherwise rotated.

In such embodiments, several (individual) shapes may be placed together to form a composite rudimentary boundary, the composite rudimentary boundary being the union of the individual shapes. The individual shapes may be of a same or of different shapes or some of the same shape and some of different shapes. Of course, two boundaries of a same shape may be of different extents (such as different radii).

To enable a robotic lawnmower 100 to properly cover a work area 205 utilizing a rudimentary border, the robotic lawnmower 100 is configured to operate based on the grass sensor as well. The robotic lawnmower 100 is thus configured to determine a position and to determine that the robotic lawnmower 100 is operating on grass and as long as the position is on grass and within the rudimentary boundary 220, the robotic lawnmower 100 continues operating. The robotic lawnmower 100 will thus continue operating until it either reaches the rudimentary boundary or an edge E of the grass.

The robotic lawnmower 100 is configured to determine the position based on any of the navigational means discussed above, be it satellite navigation sensor 175, deduced reckoning sensors 180, visual navigation sensors 180 or magnetic sensors 170 in combination with deduced reckoning sensors to mention a few examples.

The robotic lawnmower 100 is configured to determine that it is operating on grass based on the grass sensor as discussed in the above, for example with reference to FIG. 1B.

This allows the robotic lawnmower to safely operate on most of the grass of the work area, without risking to leave the work area 205.

FIG. 3B shows an example where a rudimentary boundary 220 has been overlaid the work area 205 and from this it can be seen how the robotic lawnmower 100 will be able to cover most of the work area 205 safely without departing from the bounded area.

FIG. 3B shows two examples of rudimentary boundaries. One of these 220-1 is big and covers most of the work area 205 and this allows a user to establish a rudimentary boundary very quickly which still serves to operate on most of the grass.

The other rudimentary boundary 220-1 is smaller and enables for a more accurate approximation of the work area, which can come in handy as there may be grassy areas—or areas that can be mistaken for grass—also outside the actual work area, but within the rudimentary boundary 220, that should not be operated upon, such as vegetable gardens, neighbour's lawn, football fields (football fields often require precise and specific mowing) and so on.

FIG. 3C shows a further improvement of the invention as realized by the inventors, wherein a maximum distance 222 outside the rudimentary boundary 220 is indicated by a dotted line. This indicates a maximum distance that the robotic lawnmower 100 is allowed to pass the rudimentary boundary as long as the robotic lawnmower 100 is operating on grass. This operates based on the assumption that as long as the robotic lawnmower 100 stays on the grass, it is (fairly) safe.

In some embodiments the maximum distance is an absolute distance, such as 0.5, 1, 1.5, 2, 2.5 or 5 meters or any distance there in-between from the boundary 220.

In some embodiments the maximum distance is a relative distance, such as 0.5, 1, 1.5, 2, 2.5 or 5 times the length of the robotic lawnmower 100 or any distance there in-between from the boundary 220.

In some embodiments the maximum distance is a relative distance, such as 1, 5, or 10% of a length of the work area 205 (or the rudimentary boundary 222) or any distance there in-between from the boundary 220.

The maximum distance may be homogenous—as in the same at all positions along the boundary 220. The maximum distance may also be heterogenous—as in not the same at all positions along the boundary 220, wherein the maximum distance may be one distance at a first portion of the boundary and a second distance at a second portion of the boundary 220. For example, on an upper portion of an oval rudimentary boundary the maximum distance may be shorter than on the sides. One such example is where the maximum distance is determined relative the size of the rudimentary boundary.

The robotic lawnmower 100 is thus in some embodiments further configured to pass the rudimentary boundary if it can be determined that the robotic lawnmower 100 will still be operating on grass. The robotic lawnmower 100 is thus configured to operate as long as it detects that it is operating on grass and the robotic lawnmower 100 is inside (within) the rudimentary boundary plus the maximum distance. It should be noted that the robotic lawnmower 100 will still turn if it detects that it is at a grass edge.

Figure 3D:
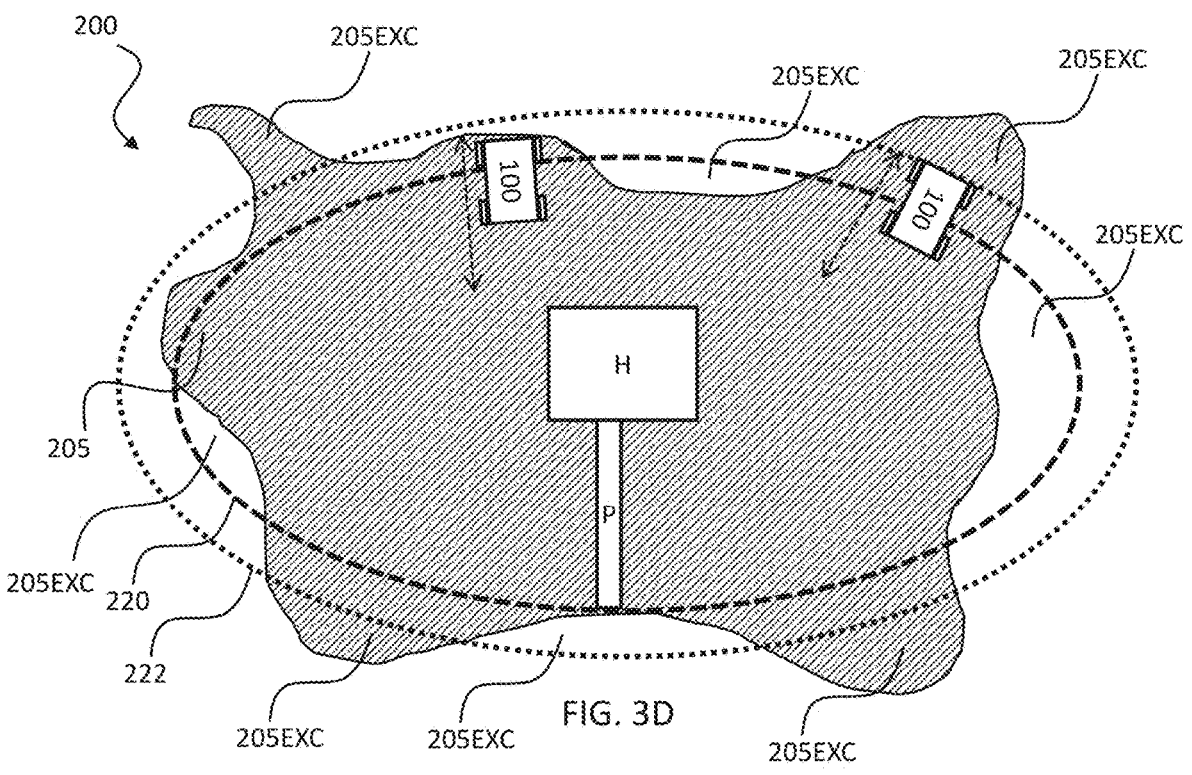

FIG. 3D shows two examples, one where the robotic lawnmower 100 has passed the rudimentary boundary 220 and turns as it reaches the maximum distance and one where the robotic lawnmower turns when it reaches the grass edge. The turning is indicated by the double-headed arrow.

It should be noted that the operation herein referred to as turning may be a reversal and then turn, a 180 degree turn, a turn of other degree or any other manner for a robotic lawnmower to turn back from a boundary. The terminology turn is thus to be understood as turn back from the boundary.

As mentioned above, the robotic lawnmower 100 is configured to turn as an edge of the grass is detected. In order to enable the robotic lawnmower 100 to navigate features which are not covered with grass in the work area, the robotic lawnmower 100 may in some embodiments be configured to identify such features—for example through visual image analysis or through comparing a location of a feature with a stored location on a map application.

However, in order to enable the robotic lawnmower 100 handle other unknown features, the inventors are providing a minimum distance as well, within which the robotic lawnmower is to continue operating even if a grass edge is detected, possibly while turning off the work tool, enabling the robotic lawnmower 100 to move over the uncovered area. However, if the robotic lawnmower is outside the minimum distance when the grass edge is detected, the robotic lawnmower 100 is configured to turn—thus assuming that there will be no more grassy areas between the current location and the boundary.

In some embodiments the minimum distance is an absolute distance, such as 0.5, 1, 1.5, 2, 2.5 or 5 meters or any distance there in-between from the boundary 220.

In some embodiments the minimum distance is a relative distance, such as 0.5, 1, 1.5, 2, 2.5 or 5 times the length of the robotic lawnmower 100 or any distance there in-between from the boundary 220.

In some embodiments the minimum distance is a relative distance, such as 1, 5, or 10% of a length of the work area 205 (or the rudimentary boundary 222) or any distance there in-between from the boundary 220.

The minimum distance may be homogenous—as in the same at all positions along the boundary 220. The minimum distance may also be heterogenous—as in not the same at all positions along the boundary 220, wherein the minimum distance may be one distance at a first portion of the boundary and a second distance at a second portion of the boundary 220.

Figure 3E:
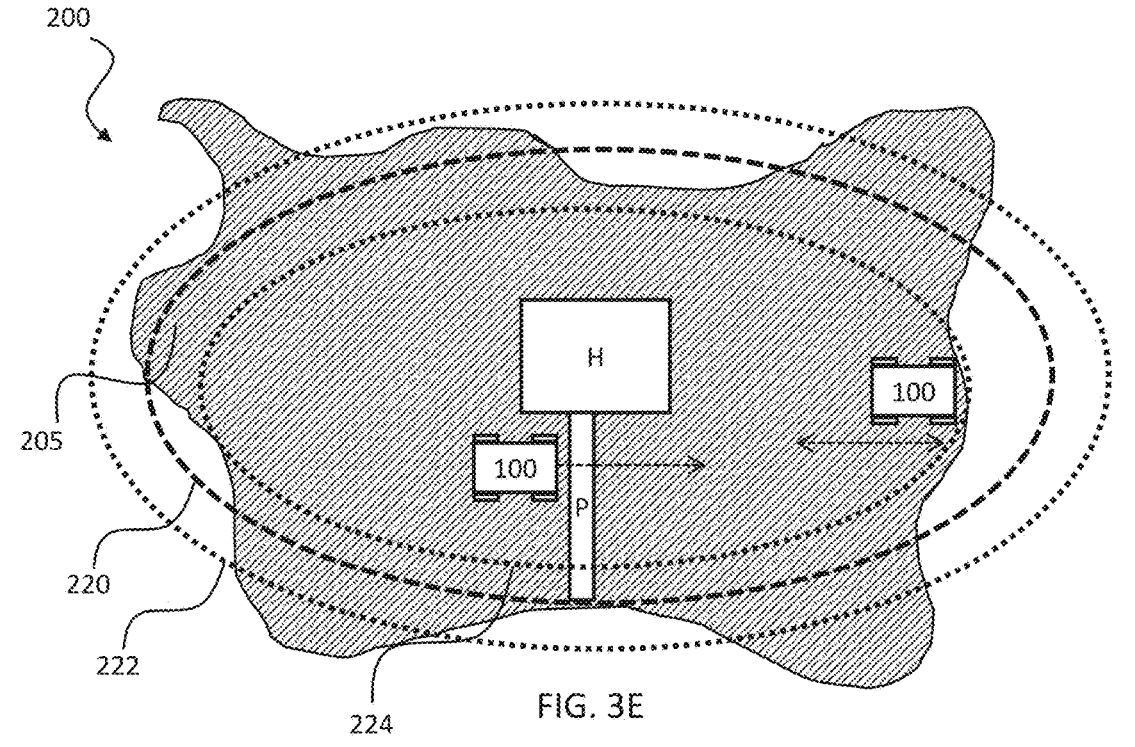

FIG. 3E shows an example where a minimum distance 224 is also indicate with a dotted line. FIG. 3E shows two examples; one where the robotic lawnmower 100 is able to pass over the path P and one where the robotic lawnmower will turn before reaching the boundary 220.

This alleviates the need for the robotic lawnmower to learn or for the user to specify such features, which thus simplifies the robotic lawnmower 100 and the installation.

Figure 4:
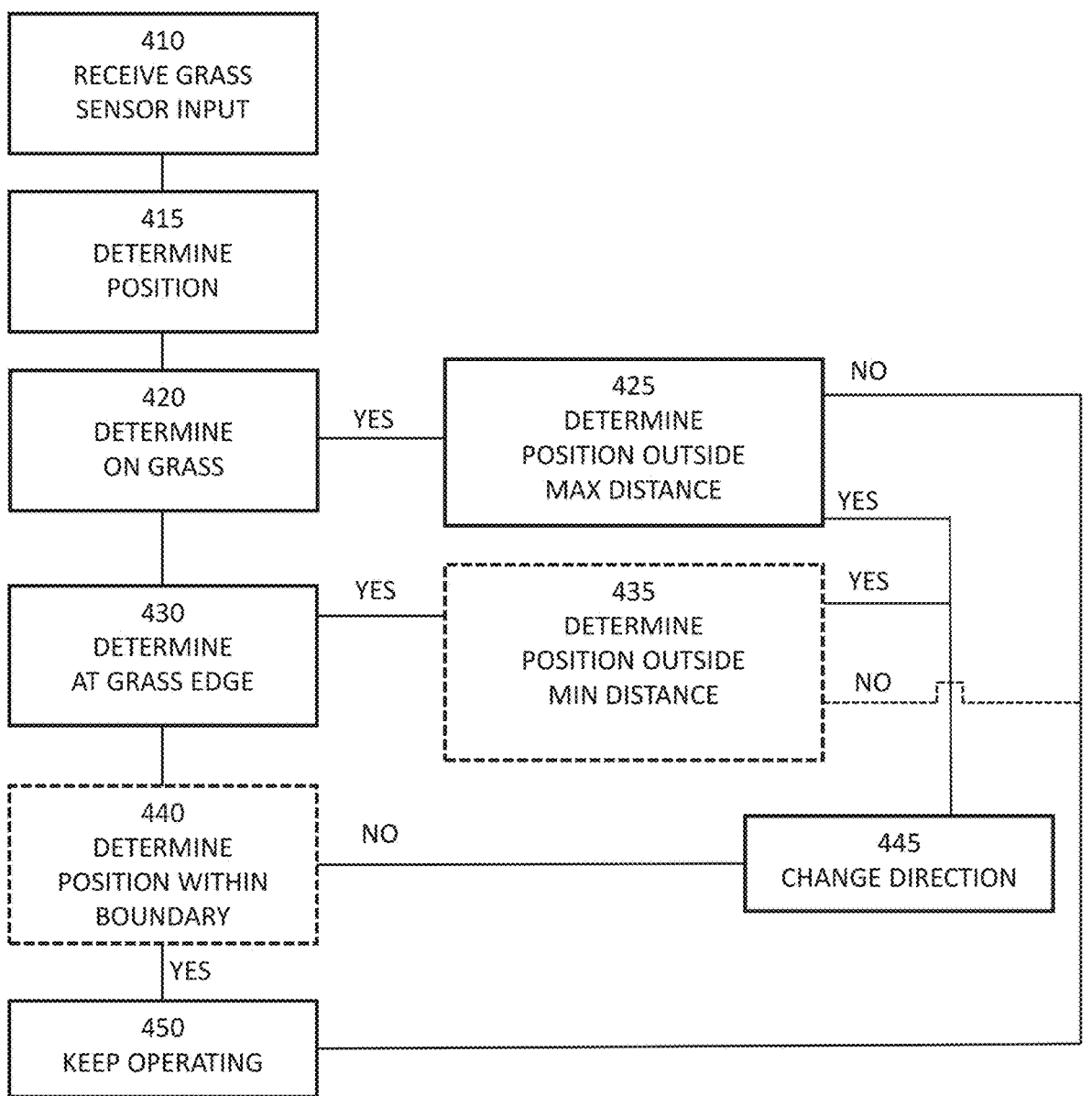
FIG. 4 shows a corresponding flowchart for a method according to some example embodiments of the teachings herein.

FIG. 4 shows a flowchart for a general method according to herein. The method is for use in a robotic work tool as in FIG. 1A in a manner as discussed above in relation to FIGS. 2, 3A, 3B, 3C and 3D, namely for use in a robotic work tool system comprising a robotic work tool 100 arranged to operate in an operational area 205, the operational area 205 having a surface that is at least partially covered with grass.

The method comprises a controller 110 of the robotic lawnmower 100 receiving 410 input from a grass sensor 185 and also determining 415 a position of the robotic lawnmower 100. As would be apparent to a skilled person the various actions taken in the method need not be taken in the order discussed. For example, the position may be determined before the grass sensor input is received, or even later, for example when it is to be determined where a position actually is.

The robotic lawnmower 100 is further configured to determine 420 that it is on grass (YES) and as long as it determines that it is within the boundary 220, and also in some embodiments as discussed above within the maximum distance 222, it continues to operate 450, and if outside, it turns 435. It should be noted that such determinations may be made continuously or when it is detected that one of the conditions actually fail, such as when detecting that the boundary is passed.

The robotic lawnmower is also configured to determine 430 that it is at a grass edge, being one instance of when the robotic lawnmower 100 is not operating on grass, and if so turn 435. In some embodiments, as indicated by the dashed lines in FIG. 4, the robotic lawnmower only turns if it is determined that the robotic lawnmower is outside the minimum distance 224.

It should be noted that the determinations whether the robotic lawnmower 100 is inside the maximum distance and/or outside the minimum distance may be determined differently depending on whether the distances are measured from the boundary or from center points as would be understood by a skilled person.

As would be understood, the robotic lawnmower 100 may be arranged to operate also outside the grass and may thus be configured to keep operating 450 as long as the robotic lawnmower 100 determines 440 that it is within the boundary 220.

It should be noted that even though the examples given herein are discussing the robotic work tool turning, this is only one example of changing a direction of operation and in a more general formulation the robotic work tool is configured to change direction of operation. Other examples of changing operation include reversing and turning and reversing. Any, some or all these examples thus apply to any example given herein relating to turning. Specifically, the change of direction of operation is to ensure that the robotic work tool does not move further away from the rudimentary boundary. In one embodiment the change of direction is towards the rudimentary boundary.

Figure 5:
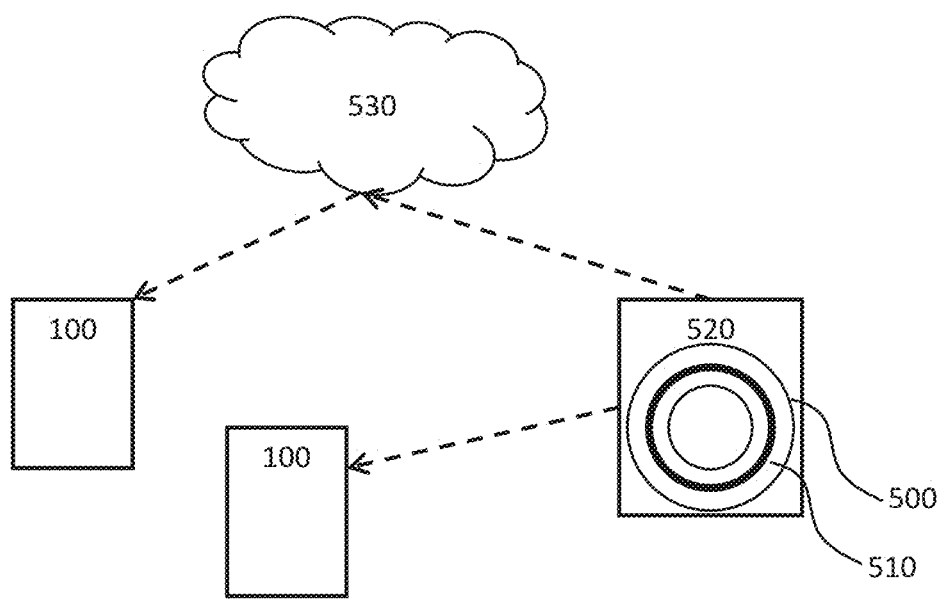
FIG. 5 shows a schematic view of a computer-readable medium carrying computer instructions that when loaded into and executed by a controller of a robotic work tool, enables the robotic work tool to implement the teachings herein.

FIG. 5 shows a schematic view of a computer-readable medium 500 carrying computer instructions 510 that when loaded into and executed by a controller of a device, such as a robotic work tool 100 or a server 240, enables the device to implement the teachings herein. In the example of FIG. 5, the device will be exemplified as the robotic work tool 100. The computer-readable medium 500 may be tangible such as a hard drive or a flash memory, for example a USB memory stick or a cloud server. Alternatively, the computer-readable medium 500 may be intangible such as a signal carrying the computer instructions enabling the computer instructions to be downloaded through a network connection, such as an internet connection. In the example of FIG. 5, a computer-readable medium 500 is shown as being a hard drive or computer disc 500 carrying computer-readable computer instructions 510, being inserted in a computer disc reader 520. The computer disc reader 520 may be part of a cloud server 530—or other server—or the computer disc reader 520 may be connected to a cloud server 530—or other server. The cloud server 530 may be part of the internet or at least connected to the internet. The cloud server 530 may alternatively be connected through a proprietary or dedicated connection. In one example embodiment, the computer instructions are stored at a remote server 530 and be downloaded to the memory 120 of the robotic work tool 100 for being executed by the controller 110.

The computer disc reader 520 may also or alternatively be connected to (or possibly inserted into) a robotic work tool 100 for transferring the computer-readable computer instructions 510 to a controller of the robotic work tool 100 (presumably via a memory of the robotic work tool 100).

FIG. 5 shows both the situation when a robotic work tool 100 receives the computer-readable computer instructions 510 via a server connection and the situation when another robotic work tool 100 receives the computer-readable computer instructions 510 through a wired interface. This enables for computer-readable computer instructions 510 being downloaded into a robotic work tool 100 thereby enabling the robotic work tool 100 to operate according to and implement the invention as disclosed herein.

The invention claimed is:

1. A robotic work tool system comprising a controller, a robotic work tool arranged to operate in an operational area at least partially covered with grass and bounded by a rudimentary boundary, and a server with a memory operable to store information including one or more operational area maps, wherein the controller is operably connected to the server, the robotic work tool, and at least one grass sensor disposed at a height and configured to detect grass near the robotic work tool within a field of view, further wherein the controller is configured to receive sensor input from the at least one grass sensors,
determine a position of the robotic work tool,
determine that the robotic work tool is on grass and not at an edge of the grass, and then
determine that the position is beyond at least one maximum distance outside of the rudimentary boundary and then change direction of operation or
determine that the position is within the maximum distance outside of the rudimentary boundary and then keep operating.

2. The robotic work tool system according to claim 1, wherein the controller is further configured to determine that the robotic work tool is at a grass edge and then change direction of operation.

3. The robotic work tool system according to claim 2, wherein the controller is further configured to determine that the position is within a maximum distance internal to the rudimentary boundary and then keep operating or determine that the position is beyond the maximum distance internal to the rudimentary boundary and then change direction of operation.

4. The robotic work tool system according to claim 1, wherein the robotic work tool further comprises a satellite navigation sensor operably connected to the controller and wherein the controller is configured to determine the position of the robotic work tool based on the satellite navigation sensor.

5. The robotic work tool system according to claim 1, wherein the robotic work tool further comprises a visual navigation sensor operably connected to the controller and wherein the controller is configured to determine the position of the robotic work tool based on the visual navigation sensor.

6. The robotic work tool system according to claim 1, wherein the controller is further configured to determine the position of the robotic work tool based on a map application, and wherein the rudimentary boundary is indicated in said map application.

7. The robotic work tool system according to claim 1, wherein the controller is further configured to receive the rudimentary boundary as one or more geometric shapes from the server.

8. The robotic work tool system according to claim 1, wherein at least one maximum distance outside of the rudimentary boundary at a nearest point along the rudimentary boundary comprises an outward displacement from the rudimentary boundary at said nearest point in a vector perpendicular to the axis tangential to the rudimentary boundary at said nearest point.

9. The robotic work tool system according to claim 8, wherein the maximum distance is the same for all points along the rudimentary boundary.

10. The robotic work tool system according to claim 1, wherein the controller is further configured to change the direction of operation by turning.

11. The robotic work tool system according to claim 1, wherein the controller is further configured to change the direction of operation by reversing.

12. The robotic work tool system according to claim 1, wherein the robotic work tool comprises a robotic lawn-mower.

13. A method for using a robotic work tool system comprising a controller operably connected to a robotic work tool arranged to operate in an operational area at least partially covered with grass and bounded by a rudimentary boundary, the controller further operably connected to a server with a memory operable to store information includ-ing one or more operational area maps, and at least one grass sensor disposed at a height and configured to detect grass near the robotic work tool within a field of view, wherein the method comprises receiving sensor input from the at least one grass sensors,
determining a position of the robotic work tool,

14 determining that the robotic work tool is on grass and not at an edge of the grass, and then
determining that the position is beyond at least one maximum distance outside of the rudimentary boundary and then changing direction of operation or determining that the position is within the maximum distance outside of the rudimentary boundary and then keeping operating.

14. A non-transitory computer-readable medium carrying computer instructions that when loaded into and executed by a controller of a robotic work tool enables the robotic work tool to implement the method according to claim 13.

15. The robotic work tool system according to claim 8, wherein maximum distances are different for at least two points along the rudimentary boundary.

16. The robotic work tool system according to claim 1, further configured wherein receiving sensor input and/or determining that the robotic work tool is on grass comprises at least one camera, stereo camera, red-green-blue camera, infrared sensor, sematic segmentation, normalized differ-ence vegetation index, or any combination thereof.

* * * * *